United States Patent Office 2,914,511
Patented Nov. 24, 1959

2,914,511

COPOLYMERS OF QUINODIMETHANES AND SULFUR DIOXIDE

Louis A. Errede, Westfield, and Billy F. Landrum and Horace R. Davis, Cedar Grove, N.J., assignors, by mesne assignments, to Minnesota Mining and Manufacturing Company, St. Paul, Minn., a corporation of Delaware No Drawing. Application March 5, 1956
Serial No. 569,262

16 Claims. (Cl. 260—79.3)

This invention relates to a novel and useful polymeric composition of improved properties, and to a method for the preparation thereof. In one aspect this invention relates to a novel and useful polymer containing aromatically unsaturated nuclei and having improved molding properties. In another aspect this invention relates to a novel process for the preparation of novel and improved polymers containing recurring aromatically unsaturated nuclei. In still another aspect this invention relates to the production of novel and valuable high molecular weight aromatically unsaturated plastics of improved molding properties.

It is known that certain polymers which contain aromatically unsaturated nuclei such as poly-p-xylylene, have certain desirable properties which make them valuable as electrical insulators, and as protective coatings which have high heat stability and extraordinary resistance to attack by corrosive liquids and excellent impermeability to common organic solvents. However, in spite of these desirable characteristics such polymers have been confined to somewhat limited commercial application as a result of certain less desirable properties such as their nonflexibility and their reluctance to be molded except at very high temperatures ranging between about 350° C. and about 450° C.

It is an object of the present invention to provide new and valuable polymers of improved properties.

Another object of this invention is to provide new and valuable polymers containing recurring aromatically unsaturated nuclei and which can be molded into a variety of useful end products at relatively low temperatures and which possess good heat stability and electrical properties.

Another object of this invention is to provide a new and valuable polymer which can be applied to surfaces as a protective coating.

Another object is to provide a novel thermoplastic which can be molded into various end products which are particularly useful in applications requiring a material of excellent thermal, electrical and abrasive properties.

Another object is to provide a commercially feasible and economical process for the preparation of polymers containing recurring aromatic nuclei and which have the above-mentioned desirable characteristics.

A further object is to provide a method for the preparation of a novel thermoplastic material of improved properties which process is characterized by the maximum utilization of the starting materials and minimum formation of undesirable by-products.

Various other objects and advantages of the present invention will become apparent to those skilled in the art from the accompanying description and disclosure.

The above objects are accomplished by reacting a quinodimethane with an oxide of sulfur under conditions such that a sulfur-containing organic compound is produced as a product of the process. The preferred quinodimethanes which are reacted as described herein are those of the group consisting of p-quinodimethane, 1,4-naphthaquinodimethane, and corresponding heterocyclic quinodimethanes containing at least one heteronitrogen atom vicinal only to carbon atoms and the nuclear substitution products of the foregoing members with atoms of the normally gaseous halogens and methyl groups. Of the various oxides of sulfur which may be used as a coreactant in the process of this invention, sulfur dioxide is preferred. The process of this invention is preferably effected by interacting the quinodimethane and sulfur dioxide in a liquid medium at a temperature below about 30° C. When sulfur dioxide is interacted with the quinodimethane, a copolymerization reaction ensues leading to the production of copolymers which contain recurring units of sulfur dioxide bonded to an aromatically unsaturated nucleus through a carbon atom of an aliphatic group, the aromatic nucleus having the same cyclic skeleton as the quinodimethane starting material. The physical nature of the organic sulfur-containing products of this invention ranges from low molecular weight materials such as low melting solids and greases to higher molecular weight plastics.

The quinodimethanes used in accordance with the present invention contain from 1 to 2 six-membered rings, one of said rings being diunsaturated and having each of 2 carbon atoms of the cyclic skeleton bonded to a carbon atom of an aliphatic group through a double bond. This latter type ring which is common to each of the quinodimethanes used as a monomer in the process of this invention is referred to herein as the quinoid ring. Although the two aliphatic groups which are doubly bonded to the diunsaturated or quinoid ring may be bonded to adjacent, i.e. ortho-positioned, carbon atoms of the ring they are preferably bonded to carbon atoms of the ring which are in the para or 1,4-position to one another. The preferred quinodimethanes of this invention are those having a symmetrically diunsaturated six-membered ring to which a methylene group is doubly bonded to each of two para-positioned carbon atoms, such as, for example, in p-quinodimethane which has the structure,

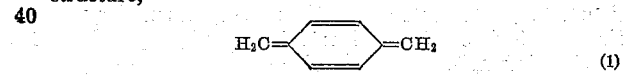
(1)

As indicated above, the term quinodimethane as used herein also includes those compounds having a quinoid ring fused to one or more aromatically unsaturated six-membered rings such as, for example, in p-naphthaquinodimethane which has the structure:

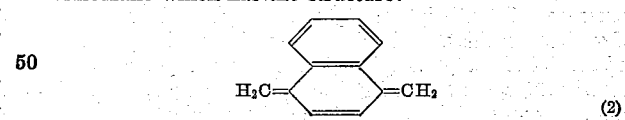
(2)

The aromatically unsaturated ring which is fused to the quinoid ring is referred to herein as the benzenoid ring.

It is to be understood that the quinodimethane starting material of this invention may be a carbocyclic compound, i.e. a cyclic compound in which each atom of the cyclic skeleton is a carbon atom such as in p-quinodimethane and 1,4-naphthaquinodimethane; or it may be a nitrogen-containing heterocyclic compound, i.e. a compound having at least one nitrogen atom as part of the cyclic skeleton. The heterocyclic compounds are preferably those in which the nitrogen is vicinal only to carbon and includes those in which nitrogen is a constituent of the quinoid ring or the benzenoid ring.

The groups which are singly bonded to the cyclic skeleton of the quinodimethane are referred to herein as the nuclear substituents and preferably are of the group consisting of hydrogen, normally gaseous halogens and methyl groups. These substituents of the dicyclic compounds may be on the quinoid ring or on the aromatically unsaturated ring or on both rings. When more than one halogen is present, they may be either the same halogens or different halogens. Of the quinodimethanes which are substituted with methyl or halogen groups, those having not more than two methyl groups or two halogens are preferred. The methylene groups which are doubly bonded to the quinoid ring may be substituted with aryl radicals, normally gaseous halogens, and lower alkyl groups such as methyl groups, without departing from the scope of this invention.

The preferred quinodimethane starting material which is reacted in accordance with the present invention is prepared by pyrolyzing an aromatic compound of the group consisting of p-xylene, 1,4-dimethyl naphthalene, corresponding heterocyclic dimethyl compounds having from 1 to 2 six-membered rings and containing at least one heteronitrogen which is vicinal only to carbon atoms, and the nuclear substitution products of the foregoing members with atoms of the normally gaseous halogens and additional methyl groups at a temperature between about 700° C. and 1300° C. and a total pressure not higher than about 400 mm. mercury for a period of not more than one second followed by quenching of the pyrolyzed vapors in a cold liquid to a temperature which is preferably below about —45° C.

Among the specific carbocyclic aromatic compounds which can be pyrolyzed to produce the aforesaid quinodimethanes which are used a reactant in accordance with the process of this invention are: p-xylene; pseudocumene; durene; isodurene; prehnitene; pentamethyl benzene; hexamethyl benezene; 1,4-dimethyl naphthalene; 1,2,3,4,6,7-hexamethyl naphthalene; 2-chloro-p-xylene; 2-fluoro-p-xylene; 2,5-difluoro-xylene; 2,5-dichloro-p-xylene; 2,3,5-trichloro-p-xylene; 2,3,5-trifluoro-p-xylene; 2,3,5,6-tetrachloro-p-xylene; 2,3,5,6-tetrafluoro-p-xylene; 2-chloro-3,5,6-trimethyl benzene; 6-chloro-1,4-dimethyl naphthalene; and 2,3,6,7-tetrachloro-1,4-dimethyl naphthalene. Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline; and 2,5-dimethyl-6-chloro-pyrazine.

The pyrolysis of the aforesaid 1,4-dimethyl substituted aromatic compounds is preferably carried out at a temperature within the range of about 900° C., to about 1300° C., for example, at about 1000° C. For best results the aromatic vapor should be present at a partial pressure substantially not higher than 150 mm. mercury. Excellent results are obtained when the partial pressure of the 1,4-dimethyl substituted aromatic compound is 10 mm. mercury or somewhat below, for example, about 5 mm. mercury. The pyrolysis can be conducted in the presence of an inert gas, such as carbon dioxide, steam or nitrogen, particularly when the partial pressure of the aromatic compound is 10 mm. mercury or below. In all cases the total pressure employed should be below 400 mm. mercury. Within the preferred pyrolysis temperature range the contact time should be within the range of from about 0.1 to about 0.001 second.

The quinodimethanes thus formed tend to homopolymerize very quickly when in the vapor phase or in solution at a temperature above about —45° C. It has been found that in the absence of a polymerization initiator the quinodimethanes do not homopolymerize rapidly at a temperature below about —45° C. The hot vapor of quinodimethane produced by the above pyrolysis reaction is quenched rapidly, therefore, in a liquid maintained at a relatively low temperature which is preferably below —45° C. The temperature at which the hot vapors are quenched depends on whether or not the quinodimethane thereby produced is to be stored over an extended period of time or whether the quinodimethane is to be used immediately as a monomer in accordance with the process of this invention. This is an important consideration since as indicated above, it has been found that the quinodimethanes form homopolymeric products at about room temperature and, in fact, they homopolymerize rapidly at temperatures above about —45° C. Thus, when it is desired to store the quinodimethane in stable form until it is to be interacted with an oxide of sulfur as described herein, the hot vapor obtained by the pyrolysis reaction is quickly quenched in a cold liquid maintained at a temperature below about —45° C. and preferably at about —80° C. or below. The solution thus prepared is stored under nitrogen until ready for use.

The liquid used for quenching and storing of the quinodimethane may be of any composition which remains liquid at the necessary temperature range and which has a relatively low partial pressure at about —45° C. consistent with the upper total pressure limit of 400 mm. mercury pressure and preferably low enough to permit operation below 10 mm. mercury pressure. The liquid also should be substantially non-reactive with the quinodimethane formed, although liquids which react to some slight degree may be used. Among the specific liquids which may be used for quenching are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloro-ethyl benzene, o-fluoro toluene and 1,1-dichloroethane; carbonyl compounds of low freezing point such as acetone, methyl ethyl ketone and methyl isobutyl ketone; ethers of low freezing point, such as diethyl ether, ethyl n-propyl ether and tetrahydrofurane; alcohols of low freezing point, such as methanol, ethanol and isopropyl alcohol; and other normally liquid compounds of low freezing point, such as carbon disulfide. If desired, liquids of low freezing point may be obtained by the blending of two or more compounds of higher freezing point. For example, mixtures of carbon tetrachloride and chloroform may be used.

A more detailed description concerning the preparation of the quinodimethane used in accordance with the present invention can be found in our prior copending application, Serial Number 386,106, filed on October 14, 1953.

The inorganic oxide of sulfur comonomer of which sulfur dioxide is preferred, may be charged to the reaction zone as a gas, liquid or solid without departing from the scope of this invention. It is to be understood that compounds which are capable of yielding an oxide of sulfur in situ may be used as the sole source of this reactant or in combination with an added oxide of sulfur without departing from the scope of this invention. Typical examples of the compounds which are capable of yielding sulfur dioxide, for example, in situ are the bisulfites such as sodium bisulfite, potassium bisulfite, sodium metabisulfite and other similar compounds.

The concentration of the quinodimethane and sulfur dioxide may vary over a relatively wide range without departing from the scope of this invention. For example, the novel sulfur-containing copolymers of this invention may be obtained by employing from about 0.1 mole to about 75 moles or higher of sulfur dioxide per mole of quinodimethane. Of the novel polymers produced in accordance with this invention, those containing at least 5 percent by weight of sulfur are preferred. In order to obtain these preferred polymers, the mole ratio of sulfur dioxide to quinodimethane is at least 0.5:1 and is preferably at least 1:1. It is particularly preferred to employ a relatively high concentration of sulfur dioxide with respect to the quinodimethane, i.e. from about 2 moles to about 15 moles or more of sulfur dioxide per mole of quinodimethane. The use of more than about a 25 molar excess, however, is generally unnecessary in order to obtain a copolymer having a substantial sulfur content.

The process of the present invention may be carried out in the presence or absence of a catalyst. Generally speaking, any peroxy type polymerization catalyst which is effective under the reaction conditions employed herein may be used. Typical examples of suitable peroxy compounds which may be employed are trichloroacetyl peroxide, difluoroacetyl peroxide and the like. When a catalyst is used, it is preferably employed in an amount of between about 0.0001 to about 0.01 mole per mole of quinodimethane.

The quinodimethane and sulfur dioxide are usually interacted at a temperature below 30° C. which temperature may be as low as —120° C. The preferred upper temperature is —10° C. As indicated above, the quinodimethanes used as the comonomer in the process of this invention tend to homopolymerize rapidly at temperatures above about —45° C. even in the absence of a polymerization initiator. Thus it is particularly preferred to contact the quinodimethane and sulfur dioxide at a temperature which is preferably below —45° C. inasmuch as the competing homopolymerization reaction is thereby kept at a minimum. Although it has been found to be preferred to contact the quinodimethane with at least an equimolar amount of sulfur dioxide comonomer at temperatures from about —120° C. to about 30° C., it is particularly important that at least an equimolar amount of sulfur dioxide be used when operating at a temperature above —45° C. Thus, for example, when p-xylene is pyrolyzed under the aforesaid conditions and the hot vapors of p-quinodimethane are quenched quickly at a temperature between about —45° C. and about 30° C., p-quinodimethane is brought into contact with at least an equimolar amount of sulfur dioxide and the quenching and copolymerization steps are carried out substantially simultaneously.

The process of the present invention may be conducted in the vapor phase or in the liquid phase and under either adiabatic or isothermal conditions. It has been found that the process is more easily controlled, more convenient to operate and that a more uniform copolymer is obtained by interacting the quinodimethane and sulfur dioxide in solution in a suitable liquid medium and that optimum yields of desired product are obtained when intimate contact is maintained between the reactants. Any of the above-mentioned liquids which may be used for quenching of the hot vapor of quinodimethane also may be employed as the liquid in which copolymerization is effected.

Although the order of addition of the reactants to the reaction zone may vary, it is preferred to add the solution of quinodimethane to sulfur dioxide which may or may not be in solution. Thus, for example, a solution of the quinodimethane may be added to a solution of sulfur dioxide while preferably agitating the reaction mixture in order to promote better contact between the reactants, and to prevent localized overheating and the build up of a high concentration of quinodimethane at the site of addition. It is within the scope of this invention to employ sulfur dioxide dissolved in a solvent which is different from, but miscible with, the quinodimethane solvent.

By proper choice of solvents it is possible to carry out the copolymerization under conditions such that the quinodimethane solvent is continuously distilled from the reaction zone, thereby making it possible to add relatively large amounts of quinodimethane without a large dilution effect. According to this procedure sulfur dioxide is dissolved in a relatively high boiling solvent such as acetone, and the quinodimethane is dissolved in a lower boiling solvent such as propane. The quinodimethane solution is maintained at a temperature of about —80° C., for example, and is added to the acetone solution of sulfur dioxide which may be at a temperature as high as about 30° C. As the cold solution of quinodimethane is added to the warmer sulfur dioxide solution, the quinodimethane solvent is vaporized and withdrawn from the reaction zone. This provides an efficient way of carrying out the process of this invention to produce high yields of sulfur-containing compounds at any temperature and particularly at temperatures above —45° C. Any sulfur dioxide monomer which may be lost by codistillation with the quinodimethane solvent may be recycled to the reaction zone.

The process of this invention also may be carried out by contacting a solution of quinodimethane with gaseous sulfur dioxide under conditions such that intimate contact between the reactants is realized. The latter procedure may be effected by spraying a solution of quinodimethane as a mist into a chamber filled with gaseous sulfur dioxide, or by bubbling gaseous sulfur dioxide through a porous ceramic disc immersed in the quinodimethane solution at a rate sufficient to convert the quinodimethane solution to a bed of tiny bubbles of sulfur dioxide.

As indicated above, agitation of the reaction mixture is helpful in promoting better contact between the monomers and is particularly recommended when it is desirable to incorporate maximum amounts of sulfur dioxide into the copolymer product. Agitation may be achieved by mechanical stirring using a reciprocating blade or propeller, by shaking the reaction vessel, by the turbulence caused by bubbling sulfur dioxide through the solution of quinodimethane or by any other known conventional methods.

Generally, the copolymerization of the quinodimethane and sulfur dioxide is carried out at atmospheric pressure, although higher and lower pressures may be employed without departing from the scope of this invention. Thus, for example, the reaction zone may be pressured with sulfur dioxide or an inert gas such as nitrogen, up to about 1,000 pounds per square inch gage. The use of higher pressures may be used to special advantage when the compounds which are capable of yielding sulfur dioxide in situ are employed as a source of this reactant or when gaseous sulfur dioxide is added to quinodimethane dissolved in a solvent in which the sulfur dioxide is not too soluble.

The process of the present invention is readily adapted to batchwise or continuous operation. The over-all reaction period may vary over relatively wide limits such as between about 1 minute and about 100 hours, but usually the copolymerization reaction is carried out over a period from about ½ hour to about 48 hours. The novel copolymer begins to form as soon as the two monomers are contacted but substantial quantities are not collected until after about ½ hour. The rate of reaction is partly dependent upon the reaction temperature. Thus at temperatures within the upper limits of the above range, i.e. from about —10° C. to about 30° C., the rate of copolymerization is faster than at the lower temperatures.

As indicated above, the reaction between the quinodimethane and sulfur dioxide is a copolymerization reaction and leads to the production of a novel sulfur-containing polymer having a recurring sulfur dioxide unit bonded to an aromatically unsaturated nucleus through the carbon atom of an aliphatic group. The sulfur dioxide adds to the doubly bonded methylene groups of the quinoid ring and thereby converts the quinoid ring to an aromatically unsaturated ring.

The preferred sulfur-containing polymer produced in accordance with the present invention contains the successively recurring unit,

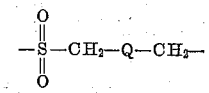

and may also contain the successively recurring unit, $-CH_2-Q-CH_2-$, wherein Q in both recurring units is an aromatically unsaturated nucleus. More specifically $-Q-$ is a cyclic nucleus containing at least one aromatically unsaturated six-membered ring to which the —CH₂— groups are bonded at nuclear carbon atoms which are in the para or 1 and 4 position to each other. The —Q— radical is preferably selected from the group consisting of a benzene nucleus, a naphthalene nucleus and an aromatically unsaturated heterocyclic nucleus containing at least one heteronitrogen atom, the nitrogen atom or atoms being vicinal only to nuclear carbon atoms, and the nuclear substitution products of the foregoing members with normally gaseous halogens and methyl groups.

The particularly preferred copolymer of the present invention is that containing the recurring unit,

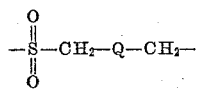

wherein —Q— is a benzene nucleus bonded at nuclear carbon atoms which are in the 1 and 4 position to each other and which contains not more than 2 methyl or 2 normally gaseous halogen substituents. Thus, one particularly preferred sulfone copolymer produced in accordance with the present invention is that which contains the recurring unit,

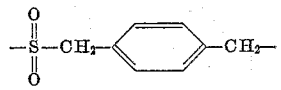

which copolymer is produced by copolymerizing sulfur dioxide with p-quinodimethane.

It has been found that the novel sulfone copolymer produced in accordance with the present invention is a copolymer in which the recurring unit,

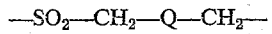

comprises between about 5 percent and almost 100 percent of the total monomer units in the copolymer and in which the recurring unit, —CH₂—Q—CH₂—, comprises between 0 percent and about 95 percent of the total monomer units in the copolymer. The total number of monomer units in the average sulfone copolymer molecule may be as high as 20,000 or higher but generally the total number of monomer units ranges between about 100 and about 1,000 which is approximately equivalent to molecular weights of between about 20,000 and about 200,000.

In order to obtain a good yield of the sulfone copolymer containing a substantially high percentage of the sulfone monomer unit, that is, between about 40 percent and about 100 percent of the —SO₂—CH₂—Q—CH₂— unit, the copolymerization of sulfur dioxide and the quinodimethane is preferably effected at temperatures below —45° C. and/or under conditions such that the maximum amount of sulfur dioxide is brought into contact with the quinodimethane as above-described.

The structure of the sulfur-containing copolymers of this invention is determined by percent composition analysis and by infra-red analysis. The polymers are stable to thermal degradation at temperatures as high as about 350° C. Generally, it has been observed that when the products are heated to a sufficiently high temperature, they break down into smaller units and that no sharp melting point is observed at or below the decomposition temperature.

The nature of the end group of the polymer products of this invention is relatively difficult to determine since it is such a small group as compared to the rest of the polymer. It is postulated without limiting the scope of this invention, however, that the end group is a methyl group.

The following examples are offered as a better understanding of the present invention and are not to be construed as unnecessarily limiting the scope of the present invention.

*Example 1*

This example illustrates the preparation of p-quinodimethane monomer.

p-Xylene vapor at 5 mm. mercury pressure and preheated to 700° C. was passed through a glass pyrolysis tube of 2.5 cm. diameter and 30 cm. in length at such a velocity that the average contact time was 0.05 second and heated to a pyrolysis temperature of 1000° C. The pyrolyzed vapors were passed directly to the top of a six liter, 3 necked glass flask which contained 3.8 liters of a chloroform-carbon tetrachloride mixture (1:1 by volume) and were then cooled in a bath of solid carbon dioxide-acetone to a temperature of —80° C. The chloroform-carbon tetrachloride mixture was continuously agitated to prevent localized heating. The liquid remained transparent for about two hours until the saturation limit was reached and then became opaque as solid p-xylene precipitated. The flask was disconnected from the train at the end of the run and the solid precipitate containing p-xylene was removed by filtration.

To prove that the mother liquor contained p-quinodimethane, a portion of it was added at —80° C. to a solution of chloroform-carbon tetrachloride containing an excess of iodine. The mixture was allowed to warm to room temperature with occasional shaking but did not change in appearance. The excess iodine was neutralized with aqueous sodium thiosulfate and the organic liquid was washed with water to remove all traces of inorganic solids. The chloroform and carbon tetrachloride were removed under vacuum and the dry residue was recrystallized from methanol to give a light brown crystalline compound having a melting point of 176°–177° C. and 70.9 percent iodine. This corresponds to the reported melting point for 1,4-di-iodomethylbenzene, namely, 177°–178° C.

The remainder of the mother liquor containing p-quinodimethane was stored under nitrogen at a temperature of —80° C. until it was desired to react it with an oxide of sulfur to form the sulfur-containing polymer of the present invention.

p-Quinodimethane is similarly prepared in acetone, hexane, toluene and any of the other liquids suitable for quenching of the pyrolyzed vapor.

*Example 2*

This example illustrates the preparation of 2-methyl-p-quinodimethane.

Pseudocumene vapor, at 5 mm. Hg pressure and preheated to 600° C., is led through the pyrolysis tube of Example 1 at such a velocity that the average contact time is 0.08 second and heated to a pyrolysis temperature of 900° C. The pyrolyzed vapors are passed directly to the top of the condenser flask of Example 1, containing 3.8 liters of acetone which is cooled in a bath of Dry Ice-acetone to a temperature of minus 60° C. The acetone in the condenser flask is continuously agitated to prevent localized heating. A deposit of polymer is rapidly formed on the uncooled upper surface of the flask and on the upper portion of the agitator. The liquid itself remains transparent for about two hours until the saturation limit is reached and then becomes opaque as solid pseudocumene precipitates out of solution, the precipitate being removed by filtration. The mother liquor contains dissolved 2-methyl-p-quinodimethane and is stored, as such, at a temperature which is preferably —80° C. or below.

*Example 3*

This example illustrates the preparation of 1,4-naphthaquinodimethane.

1,4-dimethyl naphthalene vapor, at 4 mm. Hg pressure and preheated to 600° C. is led through the pyrolysis tube of Example 1 at such a velocity that the average contact time is 0.04 second and heated to a pyrolysis temperature of 975° C. The pyrolysis vapors are passed directly to the top of the condenser flask of Example 1, containing 3.8 liters of hexane which is cooled in a bath of Dry Ice-acetone to a temperature of −60° C. The hexane solution is continuously agitated to prevent localized heating. A deposit of polymer is rapidly formed on the uncooled upper surface of the flask and on the upper portion of the agitator. The liquid itself remains transparent for about 2½ hours until the saturation limit is reached and then becomes opaque as solid 1,4-dimethyl naphthalene precipitates out of solution, which precipitate is removed by filtration. The mother liquor contains dissolved 1,4-naphthaquinodimethane and is stored, as such, at a temperature which is preferably below −60° C.

Example 4

This example illustrates the preparation of 2-fluoro-p-quinodimethane.

2-fluoro-p-xylene, at 6 mm. Hg pressure and preheated to 500° C. is led through the pyrolysis tube of Example 1 at such a velocity that the average contact time is 0.06 second and heated to a pyrolysis temperature of 950° C. The pyrolyzed vapors are passed directly to the top of the condenser flask of Example 1, containing 3.8 liters of toluene which is cooled in a bath of Dry Ice-acetone to a temperature of −80° C. The toluene solution is continuously agitated to prevent localized heating. A deposit of polymer is rapidly formed on the uncooled upper surface of the flask and on the upper portion of the agitator. The liquid itself remains transparent for about 4 hours until the saturation limit is reached and then becomes opaque as solid 2-fluoro-p-xylene precipitates out of solution, which precipitate is removed by filtration. The mother liquor contains 2-floro-p-quinodimethane which is preferably stored at a temperature of −80° C.

Example 5

This example illustrates the preparation of 2-chloro-p-quinodimethane.

2-chloro-p-xylene at 2.3 mm. mercury pressure and preheated to 500° C. is led through the pyrolysis tube of Example 1 at such a velocity that the average contact time is 0.006 second and heated to a pyrolysis temperature of 1050° C. The pyrolyzed vapors are passed directly to the top of the condenser flask of Example 1 containing 3.8 liters of toluene which is cooled in a bath of Dry Ice-acetone to a temperature of −80° C. The toluene solution is continuously agitated to prevent localized heating. A deposit of polymer is rapidly formed on the uncooled upper surface of the flask and on the upper portion of the agitator. The liquid itself remains transparent for about 4 hours until the saturation point is reached and then becomes opaque as solid 2-chloro-p-xylene precipitates out of solution, which precipitate is removed by filtration of the solution. The mother liquor contains dissolved 2-chloro-p-quinodimethane and is maintained at a temperature of about −80° C. until it is to be used.

Example 6

A weighed 9.0 gram sample of liquid sulfur dioxide was added to a glass volumetric flask containing toluene at −80° C. p-Quinodimethane (3.8 g.) in 500 ml. of toluene at −80° C. was then added and the resultant solution was mixed by gentle swirling in the absence of air. The solution was maintained at −80° in the absence of air for 2 days and was then allowed to warm to room temperature (about 20° C.). The resultant insoluble product was removed by filtration, washed with toluene and acetone and was then dried. The product (6.8 grams) was a powder and upon analysis was found to contain 16.42% sulfur which indicated a mole ratio of combined p-quinodimethane to sulfur dioxide of 1.2:1. The infrared absorption spectrum carried out in a nujol mull of this copolymer product showed the presence of phenyl, active methylene, and

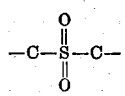

groups and that only para substitution was present on the phenyl groups. The product of this example was pressed into translucent sheets at a temperature between about 250° and 300° F.

Example 7 p-Quinodimethane (2.6 grams) in 470 ml. of toluene was charged to a glass volumetric flask containing 0.16 gram of gaseous sulfur dioxide. The reaction was run in the absence of air for 4 days at −80° C. with constant agitation after which the reaction mixture was allowed to warm to room temperature. The solution was filtered and the collected filter cake was washed with toluene and acetone, and was then dried to constant weight. The product (2.4 grams) was a powder and upon analysis it was found to contain 1.65% sulfur which indicated a mole ratio of combined p-quinodimethane to sulfur dioxide of 18.1:1.0.

Example 8 p-Quinodimethane (2.6 grams) in 470 ml. of toluene was charged to a glass volumetric flask surrounded by a solid carbon dioxide-acetone freezing bath and containing 1.6 grams of sulfur dioxide. The reaction was run in the absence of air for 4 days at −80° C. with constant agitation and was then allowed to warm to room temperature. The solution was filtered and the collected filter cake was washed with toluene and acetone, and was then dried to constant weight. The product (3.25 grams) was a powder and upon analysis it was shown to contain 13.10% sulfur which indicated a mole ratio of combined p-quinodimethane to sulfur dioxide of 1.73:1.00. About 75% of p-quinodimethane was converted to copolymer. This reaction may similarly be carried out in other solvents besides toluene such as, for example, acetone, ethyl acetate, carbon tetrachloride, hexane, cyclohexane and any of the other aforesaid liquids of low freezing point.

Example 9 p-Quinodimethane (2.21 grams) in 400 ml. of toluene was charged to a glass volumetric flask containing 44.2 grams of sulfur dioxide. The reaction was run under a nitrogen atmosphere for 4 days at −80° C. with constant agitation after which the reaction mixture was allowed to warm to room temperature. The solution was filtered, and the collected filter cake was washed with toluene and acetone, and was then dried to constant weight. The product (3.9 grams) was a powder and upon analysis was found to contain 15.94% sulfur which indicated a mole ratio of combined p-quinodimethane to sulfur dioxide of 1.3:1.0.

Example 10

A 5 gram sample of the powdered copolymer obtained in Example 9 was placed in a mold and subjected to 15,000 pounds per square inch pressure at 160° C. for about 3 minutes. The mold was then released and the pressed polymeric material was removed. The clear molded article displaced good strength properties, resistance to abrasion and was slightly opaque. Molded articles of this type are useful for buttons, buckles, and ornamental wearing apparel.

Example 11 p-Quinodimethane (3.63 grams) in 479 ml. of toluene was added to a glass volumetric flask containing 51.86 grams of sulfur dioxide. The reaction was run for 5 days under a nitrogen atmosphere at −80° C. with constant agitation after which the reaction mixture was allowed to warm to room temperature. The solution was filtered and the resulting filter cake was washed with toluene and then with acetone. Upon analysis, the powdery polymer product (6.13 grams) was found to contain 17.19% sulfur which is equivalent to a mole ratio of combined p-quinodimethane to sulfur dioxide of 1.17:1. The conversion of p-quinodimethane to copolymer was almost quantitative. This copolymer product can be pressed at about 200° C. into useful household articles such as mixing bowls, food molds, handles and the like.

*Example 12* p-Quinodimethane (3.46 grams) dissolved in 456 ml. of toluene was added to a glass volumetric flask containing 115.3 grams of sulfur dioxide. The reaction was run in the absence of air for about 2 days at —80° C. with constant agitation. The reaction mixture was then allowed to warm to room temperature. The solution was filtered and the resulting filter cake was washed with toluene and then with acetone. The powdery polyber product (5.68 grams) contained 16.36% sulfur which is equivalent to a mole ratio of combined p-quinodimethane to sulfur of 1.26:1.00.

When the other quinodimethanes of the present invention, for example, those produced in accordance with Examples 2 to 5 above, are interacted with sulfur dioxide under the reaction conditions set-forth hereinabove, novel and useful copolymers are obtained which contain a recurring sulfone group (i.e.

bonded to an aromatically unsaturated nucleus through a carbon atom of an aliphatic group. Thus, other typical examples of the novel sulfur-containing copolymers produced in accordance with this invention are those containing the following recurring groups:

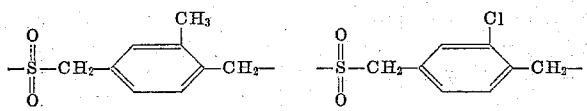

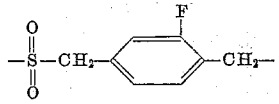

and

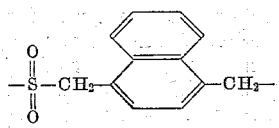

which copolymers are prepared by copolymerizing sulfur dioxide with 2-methyl-p-quinodimethane, 2-chloro-p-quinodimethane, 2-fluoro-p-quinodimethane, and 1,4-naphthaquinodimethane, respectively, using procedures similar to those employed in the above examples.

The novel sulfur-containing copolymers of this invention possess good physical, electrical, and chemical properties, and can be molded into various end products by conventional techniques such as compression and extrusion techniques. They have improved molding properties as compared to the quinodimethane homopolymers which is evidenced by their moldability at relatively low temperatures such as between about 150° C. and about 250° C. The molded products find application as useful articles of hardware, such as, gauge dials, tool boxes, tool handles, etc.; household articles such as bowls, mixing tools, food molds, clothing bags, etc., and wearing apparel such as, buttons, buckles, belts, etc. The novel sulfur-containing polymers of this invention can also be molded into films, sheets of varying thickness, tubing, etc. They also find utility as electrical insulators and protective coatings.

As is apparent, the present invention relates to a novel process which comprises reacting an oxide of sulfur with an organic compound having an unsaturated cyclic nucleus two nuclear carbon atoms of which are each doubly bonded to a carbon atom of an aliphatic group, and to the sulfur-containing organic products produced thereby. Although the preferred oxide of sulfur reactant is sulfur dioxide, it is to be understood that the other inorganic oxides of sulfur such as sulfur trioxide and sulfur monoxide and any mixture thereof, may be interacted with p-quinodimethane, for example, under the reaction conditions described herein to produce useful sulfur-containing organic compounds without departing from the scope of this invention. Various alterations and modifications of the various embodiments of this invention may become apparent to those skilled in the art without departing from the scope of this invention.

We claim:

1. The process which comprises interacting sulfur dioxide with a quinodimethane selected from the group consisting of p-quinodimethane, 1,4-naphthaquinodimethane and corresponding heterocyclic quinodimethanes containing at least one heteronitrogen atom vicinal only to carbon atoms and the nuclear substitution products of the foregoing members with the atoms of the normally gaseous halogens and methyl groups at a temperature between about —120° C. and about 30° C. so that a sulfur-containing polymer having a recurring aromatically unsaturated nucleus is produced.

2. A process which comprises reacting a mole of p-quinodimethane having from 0 to 2 methyl substituents with at least 0.1 mole of sulfur dioxide at a temperature below 30° C. to produce a sulfur-containing copolymer having a recurring aromatically unsaturated nucleus.

3. A process which comprises reacting a mole of p-quinodimethane with at least 0.5 mole of sulfur dioxide at a temperature below —10° C. in the liquid phase to produce a copolymer of said sulfur dioxide and p-quinodimethane.

4. A process which comprises reacting a mole of 2-methyl-p-quinodimethane with at least 0.5 mole of sulfur dioxide at a temperature below —10° C. in the liquid phase to produce a copolymer of said sulfur dioxide and 2-methyl-p-quinodimethane.

5. A process which comprises reacting a mole of p-quinodimethane having from 0 to 2 halogen substituents with at least 0.1 mole of sulfur dioxide at a temperature below 30° C. to produce a sulfur-containing copolymer having a recurring aromatically unsaturated nucleus.

6. A process which comprises reacting 2-chloro-p-quinodimethane with at least 0.5 mole of sulfur dioxide at a temperature below —10° C. in the liquid phase to produce a copolymer of said sulfur dioxide and 2-chloro-p-quinodimethane.

7. A process which comprises reacting 2-fluoro-p-quinodimethane with at least 0.5 mole of sulfur dioxide at a temperature below —10° C. in the liquid phase to produce a copolymer of said sulfur dioxide and 2-fluoro-p-quinodimethane.

8. A process which comprises reacting p-naphthaquinodimethane with at least 0.5 mole of sulfur dioxide at a temperature below —10° C. in the liquid phase to produce a copolymer of said sulfur dioxide and p-naphthaquinodimethane.

9. A novel copolymer of sulfur dioxide and a p-quinodimethane.

10. A novel copolymer of sulfur dioxide and p-quinodimethane.

11. A novel copolymer of sulfur dioxide and 2-methyl-p-quinodimethane.

12. A novel copolymer of sulfur dioxide and 2-chloro-p-quinodimethane.

13. A novel copolymer of sulfur dioxide and 2-fluoro-p-quinodimethane.

14. A novel copolymer of sulfur dioxide and 1,4-naphthaquinodimethane.

15. The process which comprises interacting sulfur dioxide with a quinodimethane at a temperature between about −120° C. and about 30° C. so that a sulfur-containing polymer having a recurring aromatically unsaturated nucleus is produced.

16. A novel copolymer of sulfur dioxide and a quinodimethane selected from the group consisting of p-quinodimethane, 1,4-naphthaquinodimethane and corresponding heterocyclic quinodimethanes containing at least one hetero-nitrogen atom vicinal only to carbon atoms and the nuclear substitution products of the foregoing members with the atoms of the normally gaseous halogens and methyl groups.

References Cited in the file of this patent
UNITED STATES PATENTS

| | | |
|---|---|---|
| 2,445,569 | Fox | July 20, 1948 |
| 2,680,728 | Reeder | June 8, 1954 |
| 2,719,131 | Hall | Sept. 27, 1955 |

OTHER REFERENCES

Snow et al.: Ind. Eng. Chem., 30, pp. 176, 177 (1938).
Barb.: Proc. Royal Soc. (London) 212A, 66 (1952).